May 26, 1970     T. F. ROCHE     3,514,588

RECHARGEABLE LAMP

Filed Aug. 31, 1967     3 Sheets-Sheet 1

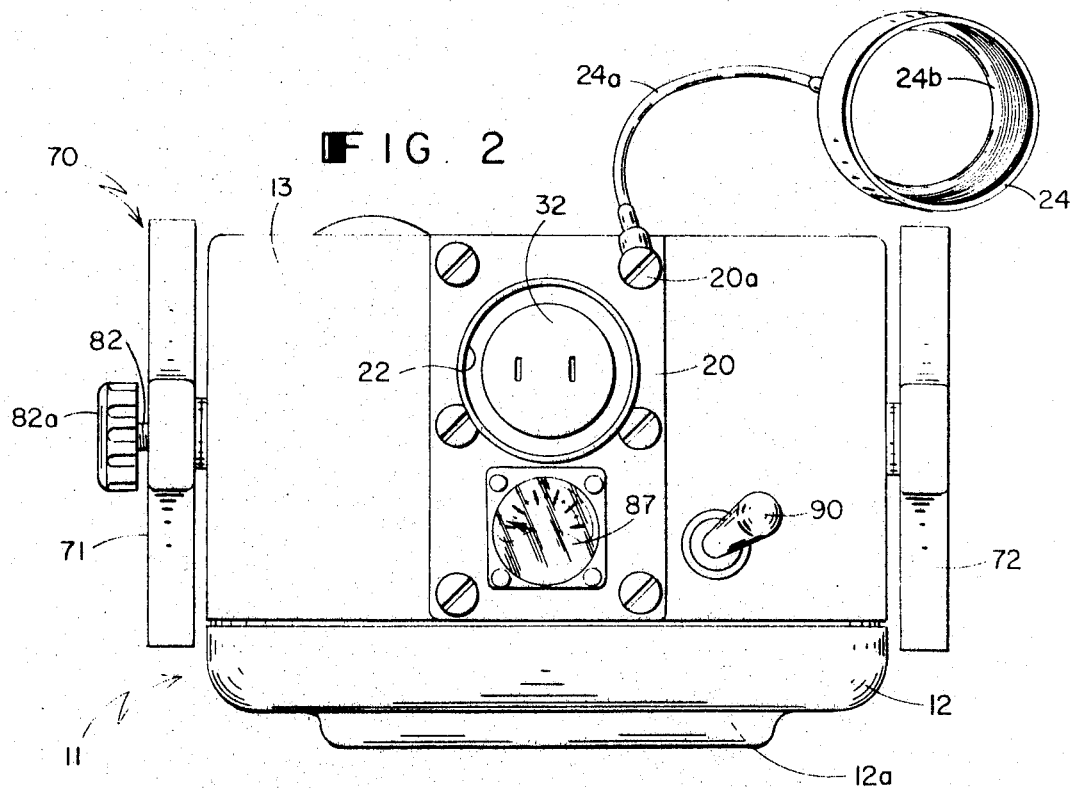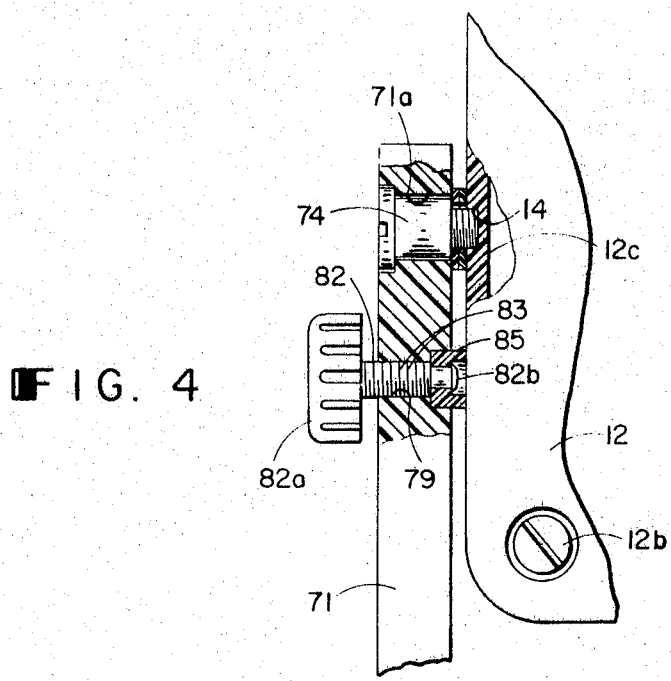

United States Patent Office 3,514,588
Patented May 26, 1970

---

3,514,588
RECHARGEABLE LAMP
Thomas F. Roche, 21 W. Main St.,
Merrimac, Mass. 01860
Filed Aug. 31, 1967, Ser. No. 664,863
Int. Cl. F21i 9/00
U.S. Cl. 240—10.6                3 Claims

ABSTRACT OF THE DISCLOSURE

A water-resistant rechargeable electric lantern for industrial, marine or military use. The lantern has a battery and battery charger within a waterproof case. Over an opening in the case is water tightly mounted an open end hollow body with a water-tight removable cap. Within the body is a male receptacle connected to the charger within the case.

BACKGROUND OF INVENTION

This invention relates to water-resistant rechargeable electric lanterns for industrial, marine, or military use. Such lanterns as have hitherto been described do not provide a safe, waterproof means for connecting to a power source. The principal object of this invention is to provide such a means.

SUMMARY OF INVENTION

The invention comprises generally a lantern containing a battery and a battery charger. On one exterior face of the lantern is an opening. Seated on this opening with a gasket is a hollow projection whose exterior is threaded to be registrable with a removable gasketed cap. Extending from the lantern into the hollow interior or well of the projection is a male receptacle.

By removing the cap, a power cord with a female end can bring power into the battery charger. Otherwise, the gasketed cap protects the outlet. Further, the use of a separate hollow projection for the outlet does not interfere with the normal compactness of a rechargeable lantern and adds only a minium of weight and dimension. The entire lantern including the projection and cover is preferably made of a water-resistant insulating material such as plastic.

BRIEF DESCRIPTION OF DRAWINGS

FIG. 2 is a plan view of the lantern of FIG. 1 with the power cord removed.

FIG. 4 is an enlargement with partial sectioning of a portion of the left side of FIG. 1.

A SPECIFIC EXAMPLE OF INVENTION

Figure 1:
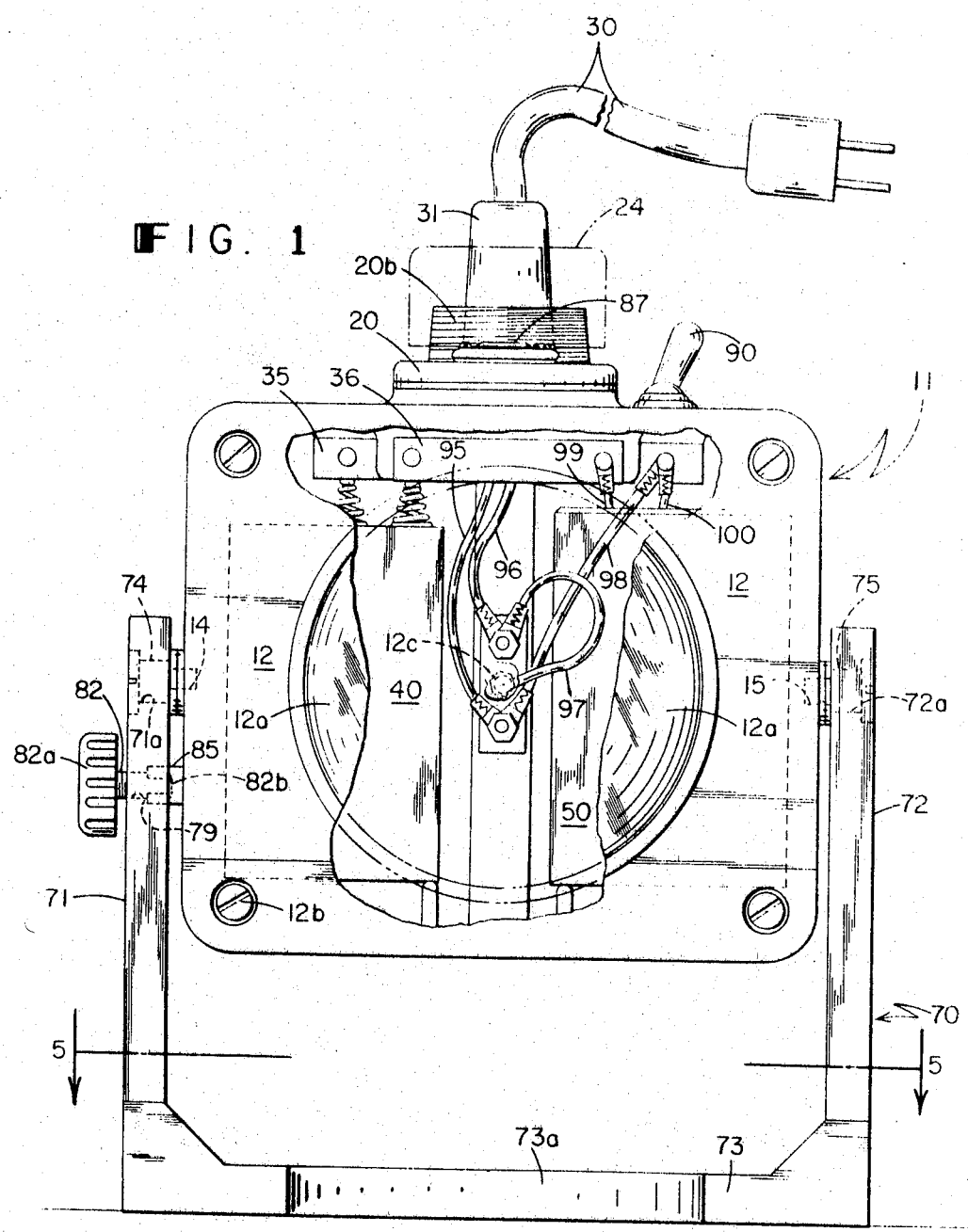
FIG. 1 is a front view of the lantern in standing position with partial cutaway, showing a power cord.
Figure 3:
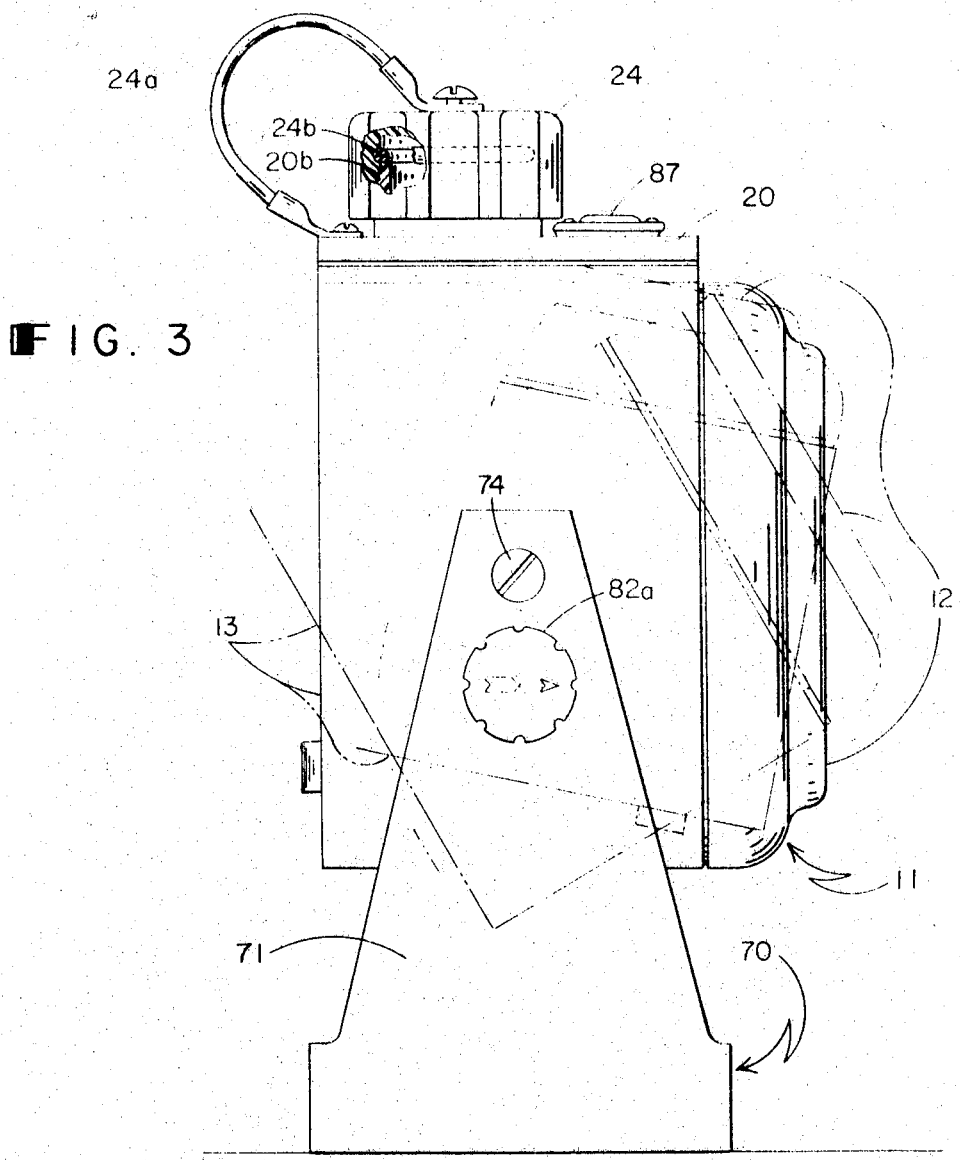
FIG. 3 is a left side elevation.
Figure 5:
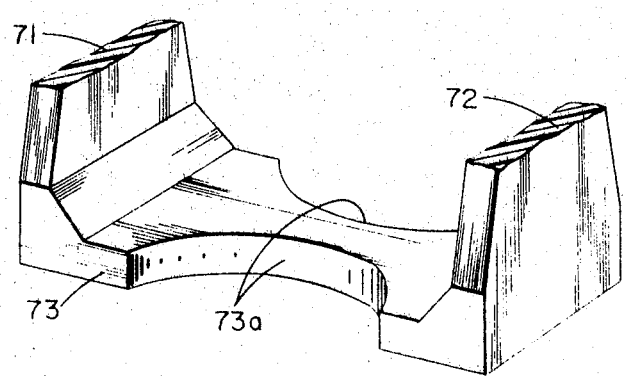
FIG. 5 is a plan view along line 5—5 of FIG. 1.

The drawings illustrate one example of this invention. The lantern 11 illustrated therein has a front section 12 and a rear body section 13 both molded from plastic. A lamp 12a is positioned in the front section with a gasket. Cover section 12 is held onto the body section 13 by means of cover mounting screws 12b in conjunction with a resilient sealing gasket. The body section 13 has a top opening and contains spaces for holding a battery 40 and a charger 50. The spring terminals of battery 40 contact bus bars 35 and 36, while leads 98, 99, and 100 run from the bus bars to the charger 50 and lead 95. Lead 97 runs from lead 96 to lamp terminal 12c.

Covering the top opening of body section 13 is a plastic body 20 attached by means of screws and a gasket 21. Plastic body 20 is provided with a projecting threaded well 22 having wall 20b. A cover 24 is attached by a cap retainer line 24a to screw 20a in body 20 and seats on the well 22 with a gasket 24b. Extending through the bottom of the well 22 is a male receptacle 32 connected to the battery charger 50 in the body 13. Meter 87 which reads the battery charge is mounted in body 20. A cord 30 with a female connector 31 and male connector is provided for bringing external current into the battery charger. Switch 90 with leads 95 and 96 operates the lamp.

The combination cradle-handle 70 comprises two flat side arm members 71 and 72 which taper in width and also slightly inwardly and are attached through orifices 71a and 72a to pivot rods 74 and 75 whose ends are anchored at recesses 14 and 15 on the sides of the lamp body 13. Recesses 14 and 15 are generally selected to be along the axis of the center of gravity of the lantern. The side portions 71 and 72 expand to join the cross flat bottom portion 73 which has an intermediate hand grip cutout 73a. The depth of the bottom portion 73 is approximately equal to the depth of body 13. The arms 71 and 72 are sufficiently long to permit 360° rotation of the lantern. The cradle 70, with its portions 71, 72, and 73 and its side orifices 71a and 72a, is preferably molded as a single piece.

In order to hold the lantern at the desired tilted position, one of the side arms, 71, is provided with an opening 79 just below the orifice 71a. The opening 79 has a threaded portion 80 which registers with the threading 83 on a shaft 82. On the reduced end 82b of the shaft 82 is mounted a nylon-phenolic cap 85 of low resilience. Cap 85 has an annular projection which engages the flat surface of the side of body portion 13. Knob 82a mounted on outer end of shaft 82 permits easy manipulation of cap 85 to loosen or tighten the lantern.

All the exposed parts of the lantern, including the housing and body, the cradle, and the position holding means are made of plastic so that there is no possibility that the lantern can act as a conductor between the individual holding or using the lantern and a source of current such as a third rail in a subway.

I claim:

1. In an electric lantern comprising a waterproof case containing a battery and battery charger, the improvement comprising: an open-end hollow body mounted in a water-tight manner over an opening in one wall of the case and a removable cap mounted water-tightly over the end of said body; said body containing a male receptacle connected to the battery charger; said body and receptacle being adapted to receive the female connector of a power line.

2. The improvement of claim 1, wherein said body comprises a plate-like base portion from which extends a tubular portion.

3. The improvement of claim 1, wherein a meter is water-tightly mounted in said body and is connected to the battery.

References Cited
UNITED STATES PATENTS

| | | | |
|---|---|---|---|
| 1,506,303 | 8/1924 | Hopkins | 240—10.6 |
| 2,628,339 | 2/1953 | Werner | 320—2 |
| 3,192,378 | 6/1965 | Oldenburger | 240—10.65 |
| 3,250,909 | 5/1966 | Oldenburger | 240—10.6 |

NORTON ANSHER, Primary Examiner

F. L. BRAUN, Assistant Examiner

U.S. Cl. X.R.
240—26; 320—3